United States Patent [19]

Kieffer et al.

[11] Patent Number: 4,858,162

[45] Date of Patent: Aug. 15, 1989

[54] METHOD AND APPARATUS USED IN MOUNTING EXPANSION CARDS

[75] Inventors: Thomas M. Kieffer, St. Louis Park; David J. Gaasedelen, Golden Valley, both of Minn.

[73] Assignee: Connect Computer Company, Inc., Minneapolis, Minn.

[21] Appl. No.: 90,941

[22] Filed: Aug. 28, 1987

[51] Int. Cl.[4] .......................... G06F 1/00; H05K 5/00; H05K 7/16
[52] U.S. Cl. ................................ 364/708; 364/709.01
[58] Field of Search ................................ 364/708, 709

[56] References Cited

U.S. PATENT DOCUMENTS 4,530,066 7/1985 Ohwaki ................................ 364/708

OTHER PUBLICATIONS

Features Illustration, Compaq Computer Company.
4-page brochure entitled Toshiba Portable Personal Computer T3100e (Exhibit A) Form No. BT3100e 11/88.

Primary Examiner—Andrew J. James
Assistant Examiner—David Soltz
Attorney, Agent, or Firm—Merchant, Gould, Smith, Edell, Welter & Schmidt

[57] ABSTRACT

An attachment for a portable computer comprising a rigid case having an interface card that is adapted to attach to the portable computer's expansion slot at one end and is adapted to attach to a standard PC expansion card at the other end. The case has room to insert a standard expansion card of ⅔ length or less. The case is sufficiently small that it may be attached to the bottom of the portable computer and still fit inside the original carrying case.

10 Claims, 4 Drawing Sheets

METHOD AND APPARATUS USED IN MOUNTING EXPANSION CARDS

BACKGROUND OF THE INVENTION

1. Field of the Invention

This invention relates to portable computers and in particular to apparatus and methods for mounting and electrically connecting an expansion card to a portable computer.

2. Description of the Prior Art

Expansion cards are often used to add to or expand the capabilities of a computer. An expansion card includes a separate printed circuit board combining appropriate circuitry for performing the added or expanded functions. The expansion card will typically further include a physical connector for interconnection to the electrical bus system of the computer via expansion slots on the mother board of the computer configured to receive the connector of the expansion card so as to provide a physical and electrical interconnection between the expansion card and the mother board of the computer. The terminology "mother board" is used to refer to the printed circuit board containing the microprocessor and associated circuitry of the computer. Expansion cards are typically used for additional memory, input-output, interconnection to network or modem, providing graphics capability, simulating a mainframe terminal or other functions. The bus system will include one or more electrical connectors used as a path over which information or power is transmitted between different locations throughout the computer.

The most common expansion card standard in the personal computer industry is the IBM PC compatible expansion card whose pin assignments are defined in IBM Technical Reference 6361459. Expansion cards will have a varying length with a full length expansion card typically having a length of roughly 34 cm. Because of limited space often available and because the full length is not required by the expansion card's circuitry, many expansion cards are sold as ½ full length of ⅜ full length. However, even these reduced length expansion cards will typically not fit in a portable or laptop computer. This necessitates the expansion card being left outside the portable computer's casing when in use. This is highly undesirable as the expansion card is exposed to dirt and other particles and can be easily damaged. Moreover, this arrangement reduces the computer's portability, since the expansion card typically must be disconnected prior to transport and separately packaged. There have been some attempts at developing separate expansion card housings for enclosing the expansion cards. These housing might be physically detached from the portable computer and have a suitable electrical cable interconnecting the expansion cards contained therein to the expansion slots of the portable computer. Other expansion card housings are physically attached to the portable computer. However, both arrangements detract from the portability of the computer since the either adds significantly to the size of the portable computer and/or must be disconnected and separately packaged for transport.

Additionally, the interface protocol of a portable or laptop computer is often different from that of a standard IBM compatible expansion card. Accordingly, the interface signals must be converted from one interface protocol to another.

The present invention solves these and other problems associated with the prior art.

SUMMARY OF THE INVENTION

This invention provides an expansion card holder that is small enough to be permanently attached to a host portable computer and not adversely affect the computer's portability. This invention also provides expansion card holders that may be retrofitted. This avoids the necessity of having to order an expansion card holder at the time the computer is bought.

One embodiment of the present invention further provides interface means for converting the electrical interface of an expansion slot of the portable computer to the electrical interface of a standard expansion card slot and for electrically connecting the expansion slot to the expansion card.

These and various other advantages and features of novelty which characterize the invention are pointed out with particularity in the claims annexed hereto and forming a part hereof. However, for a better understanding of the invention, its advantages, and its objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference numerals indicate corresponding parts throughout.

DESCRIPTION OF THE PREFERRED EMBODIMENT

Figure 1:
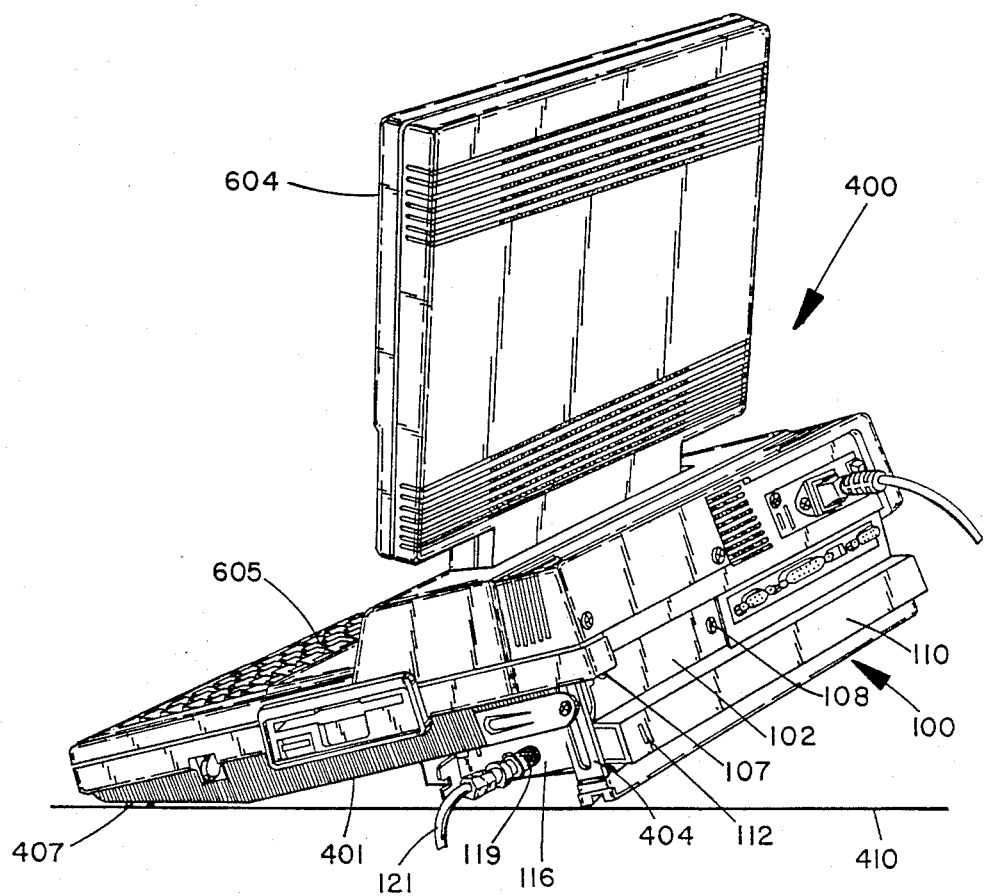
FIG. 1 is a perspective view showing an embodiment of an expansion card holder attached to a Toshiba T3100 portable computer.

Referring to the drawings where like numerals refer to like components throughout the several drawings, and more particularly to FIGS. 1–7, an embodiment of an expansion card holder 100 is shown. In the preferred embodiment, the expansion card holder is made of metal to prevent radio frequency interference (RFI), but those skilled in the art will recognize that any rigid material, such as a hard plastic, may be used.

In the embodiment shown, the holder 100 is affixed to a rear bottom surface 401 of a portable computer 400 by means of threaded fasteners inserted through holes 107, 108 and 109 and into a portable computer's casing. In a preferred embodiment these holes are positioned to align with existing screws and screw holes on the portable computer itself. This allows the embodiment of the holder 100 shown to be attached to a Toshiba T3100 portable computer without having to drill additional holes in the computer casing. Those skilled in the art will recognize that for different models of portable computers the screw holes 107, 108 and 109 may be placed in different positions to align with pre-existing holes in the computer casing and/or that other methods of affixing the holder 100 to the portable computer may be used. In various embodiments, it may be necessary to drill holes in the computer casing or attach brackets thereto.

Figure 6:
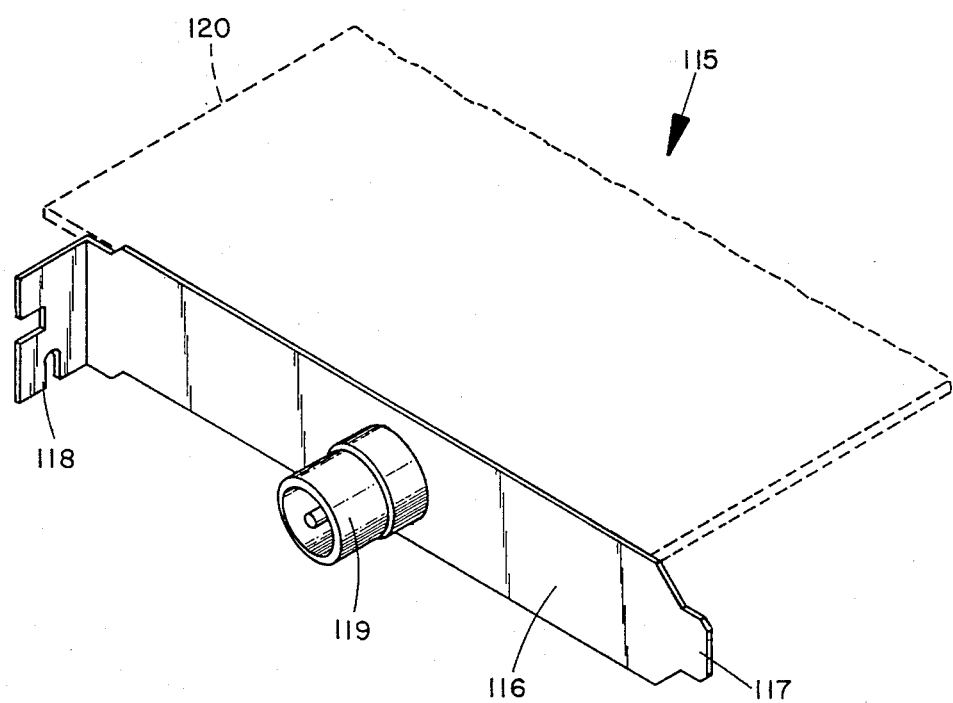
FIG. 6 is a diagrammatic perspective view of an embodiment of an expansion card; the expansion card shown including a connector for electric connection to a local area network.

The embodiment of the expansion card holder 100 shown has a flat major surface 104 with upright walls 110, 111 and 113. The front wall 113 includes a flat edge 101, the left side wall 111 includes a bracket 103 and the rear wall 110 includes an upright extension 102 on a flat edge 114. An expansion card 115 for a local area network is shown in FIG. 6. The expansion card shown is a network card used to interconnect computers to local area networks. The expansion card shown includes appropriate circuitry (not shown) mounted on a board area 120 and a network connector 119 for electrically connecting the portable computer to a network bus represented by cord 121 in FIG. 1. Expansion cards 115 typically include a bracket 116 for securing the expansion card to a computer housing. The right side of the holder 100 is unobstructed to allow positioning of the expansion card bracket 116. The expansion card 115 is secured in the holder by the use of screw hole 106 and slot 112. A tongue 117 on the expansion card bracket 116 is placed in slot 112 and a counting notch 118 on the expansion card bracket 116 receives a bolt which passes through screw hole 106. The expansion card bracket 116 fits tightly against the rear bottom surface of the computer and tightly against the card holder to help prevent dirt or other foreign objects from entering the computer. In one embodiment an insulating mat is placed on surface 104 to cushion and insulate the expansion card 115.

Figure 5:
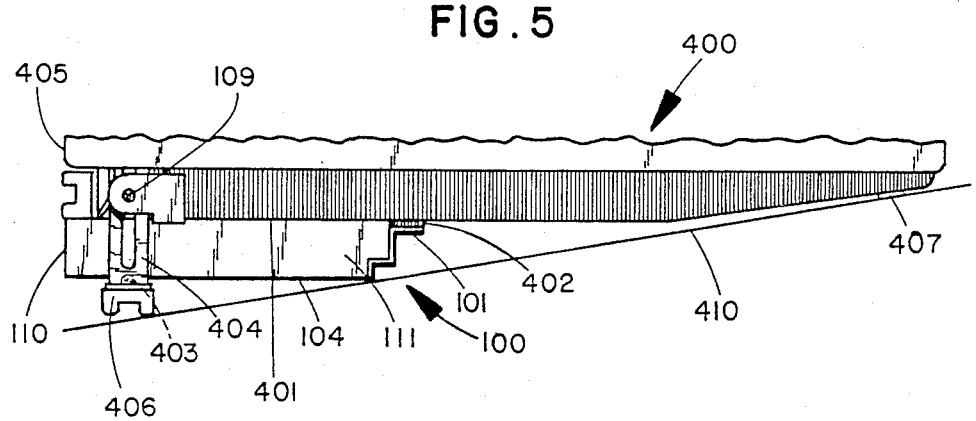
FIG. 5 is a left side view of the expansion card holder shown in FIG. 2 attached to a portable computer.
Figure 2:
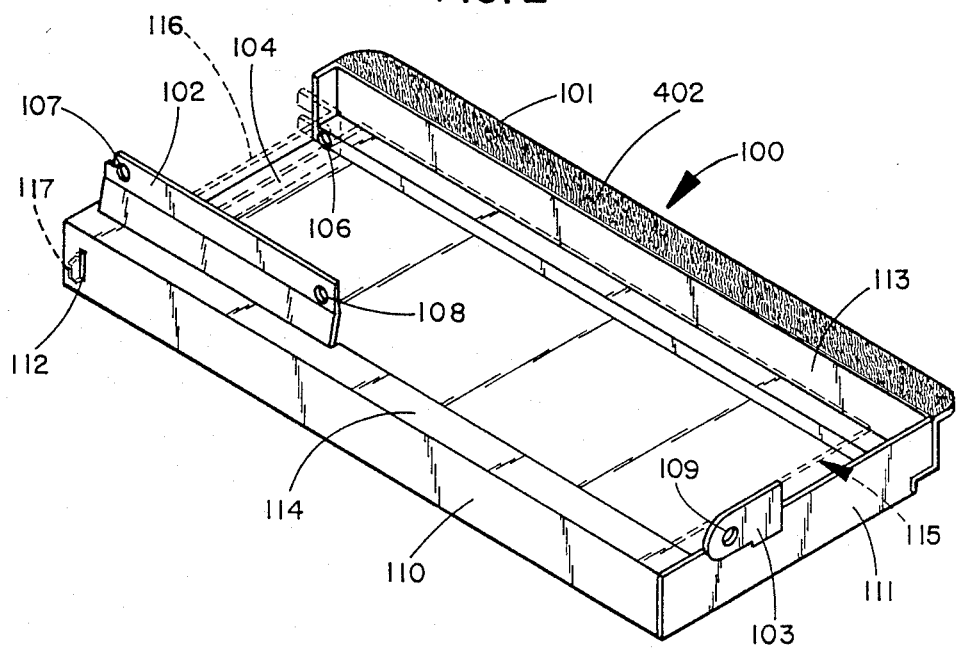
FIG. 2 is a perspective view of one embodiment of an expansion card holder in accordance with the principles of the present invention, an expansion card being shown in phantom line.
Figure 3:
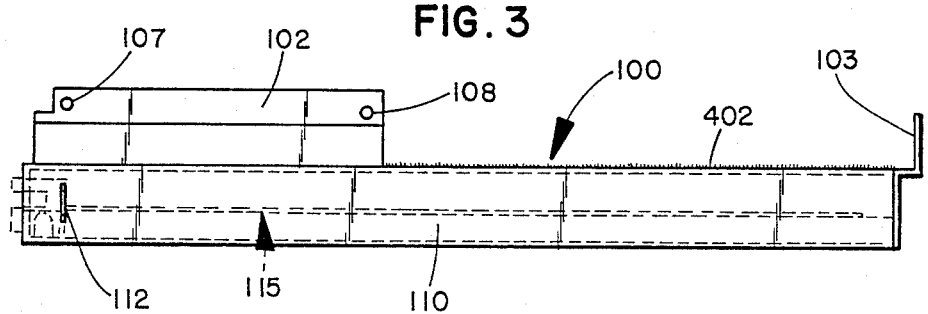
FIG. 3 is a back end view of the expansion card holder shown in FIG. 2.
Figure 4:
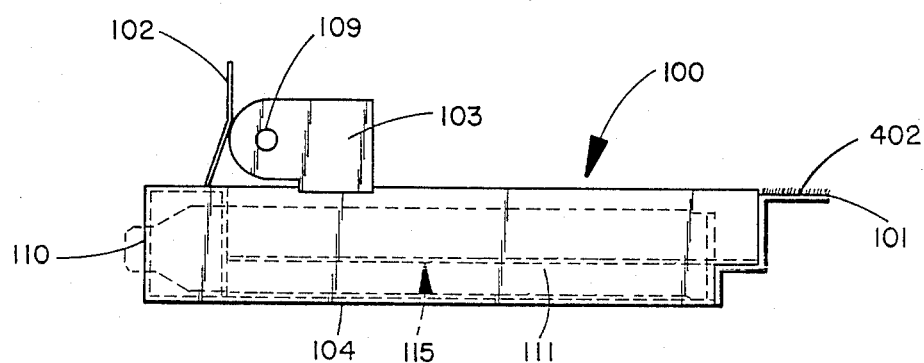
FIG. 4 is a left side view of the expansion card holder shown in FIG. 2.

FIG. 5 shows the expansion holder 100 attached to a rear bottom surface 401 of a portable computer 400. The front edge 101 has a Velco ™ strip 402 attached to it, positioned to align with a cooperating Velco ™ strip, which is attached to the bottom 401 of host computer 400 as shown in side view in FIG. 5. The Velcro ™ strip helps to attach the front edge 101 to the computer, prevents dirt from entering the card holder or the computer, and acts as a cushion. It will be appreciated that other methods of attaching might be used.

In the embodiment shown, rubber stopper 403 is positioned on a computer carrying handle 404 so as to be positioned between the bottom end 406 of the handle 404 and the holder 100 so is to space the handle 404 from the holder 100. When handle 404 is used as the support for the computer, the rubber stopper 403 insures that the card holder 100 does not adversely affect the stability of the portable computer. The stopper bottom end 406 of the handle and footpad 407 on the bottom front end of the portable computer 400 provide two locations upon which the portable computer 400 rests such that computer 400 does not rock or otherwise exhibit a lack of stability when on a flat surface 110. As seen in FIG. 5 and FIG. 1, the rear wall 110 of the expansion card holder and the rear of the computer 400 are aligned such that the expansion card holder 100 does not increase the overall length of the portable computer.

It can be further seen in FIG. 1 that the width of the preferred embodiment of the expansion card holder 100 is of the same width as the portable computer 100. Since the length and width of the portable computer 400 with the expansion card holder 100 attached is not greater than the length and width of the portable computer alone, it is possible to fit the portable computer with the expansion card holder attached into the original carrying case. Another advantage is that the portable computer with the expansion card holder attached rests solidly on the bottom end 406 of the handle 404 and the footpad 407 of the computer 400. This prevents any pivoting or rocking about the expansion card holder even though the holder is attached to the underside of the portable computer. The handle 404 elevates the rear portion of the portable computer 400 making it easier for the user to see screen 604 and use keyboard 605.

The expansion card holder in the present embodiment is box shaped, having a major surface and upright walls. The dimensions are approximately 28.6 cm long, 12.1 cm wide and 1.6 cm deep. This is of sufficient size to contain a standard PC expansion card of ⅔ length or less. It is the Applicants' intention that the dimensions may be changed and still be included within the spirit and scope of the claims.

Figure 7:
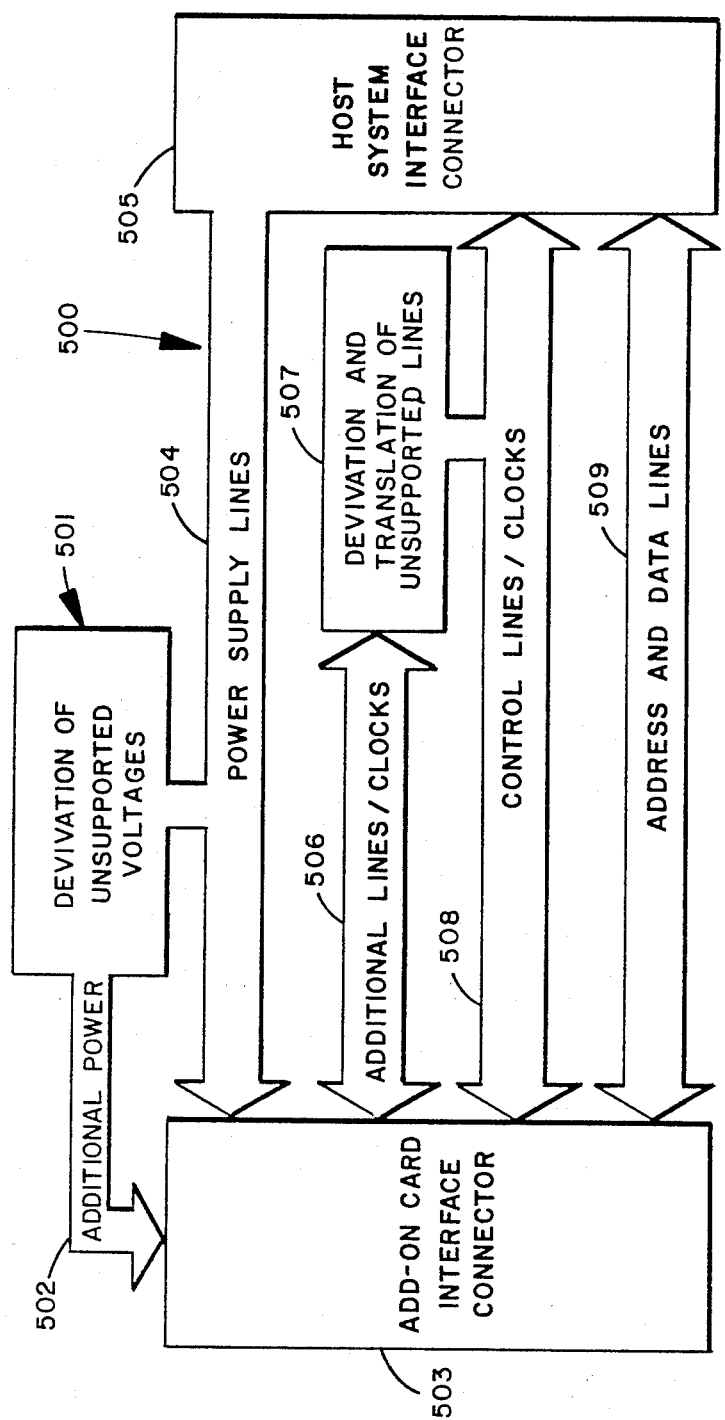
FIG. 7 is a block diagram of one embodiment of interface conversion card electronics in accordance with the principles of the present invention.

In one embodiment of the present invention, an interface conversion card 500 is positioned in the portable computer 400 for electrically converting the electrical interface of the portable computer 400, in this case a Toshiba T3100, expansion slot to the electrical interface of a standard IBM PC compatible expansion card. In yet other embodiments, the conversion card 500 might be contained in the expansion card holder 100. A block diagram of an embodiment of the interface conversion card 500 is illustrated in FIG. 7. The T3100 expansion slot is depicted by 505. The pin assigned for the T3100 expansion slot may be found in Toshiba T3100 Expansion Interface Documentation available from Toshiba. The pin assignment for the expansion slot on the Toshiba T1200 and the Toshiba T1100 plus may also be obtained from Toshiba. The standard PC expansion card slot is depicted by 503. Pin assignment for a standard PC expansion card is available from IBM as Technical Reference 6361459 hereby incorporated by reference. Additional power necessary for the standard PC card is derived from the power supply lines 504 of the T3100 slot. The derivation and translation of unsupported lines is performed by block 507. Additional power lines are represented by 502. Additional lines are represented by 506, control lines are represented by 508, and address and data lines are represented by 509.

The interface conversion card 500 electrically interconnects and converts the host computer's expansion slot bus system to a standard PC expansion card bus system. This conversion enables the user to connect the host portable computer to a local area network using a standard network expansion card. Suitable conversion circuitry might also be used to allow the user to connect the host computer to other devices such as a main frame or a modem.

The expansion card holder 100 is installed by electrically interconnecting the interface conversion card 500 to the expansion card slot in the portable computer 400. The conversion card 500 is installed in the portable computer 400. The interface conversion card 500 is also electrically interconnected to the expansion card 115 via a ribbon cable (not shown) extending from the card holder 100 behind the wall 102 and into the portable computer 400. Thus, the electrical cables interconnecting the expansion card 115 are completely enclosed. Expansion card 115 is affixed to expansion card holder 100 by sliding the tongue 115 on the expansion card bracket 116 through slot 112 of the expansion card holder. Notch 118 on expansion card bracket 116 is aligned with screw hole 106 and a bolt provided is used to secure notch 118 to screw hole 106. The screw on the handle of the portable computer in then unscrewed as are the two screws on the back of the computer. Expansion card holder 100 is then attached to the rear bottom surface 401 of the computer 400. Screw hole 107 and 108 on the expansion card holder are aligned with the screw holes in the computer casing. Screw hole 109 on the expansion card holder 100 is aligned with the screw hole on the handle of the portable computer. Velco strip 402 on the expansion card holder 100 is aligned with a Velco TM strip that is affixed to the bottom surface of the portable computer. The bolts are inserted through screw holes 107, 108 and 109 into their respective holes in the computer casing. The Velco TM strip 402 is then affixed to the cooperating Velco TM strip on the computer. This provides for a securely attached expansion card holder which will not interefer with the portability of the computer.

While one embodiment of the present invention includes attaching the expansion card holder to a Toshiba T3100, other embodiments include attaching the expansion card holder to IBM, Epson, Zenith, Tandy, or other Toshiba portable computers, etc.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An expansion unit for a portable computer having a bottom surface, a back end, a front end, and a handle proximate the back end, the portable computer being supportable on a flat surface such as a desk top proximate its front end and a bottom surface of its handle so as to define a space between the bottom surface of the computer and a plane extending from the front end of the portable computer to the bottom surface of the handle, the expansion unit comprising:
    a hollow, rigid expansion card holder mounted on the bottom surface of the portable computer proximate the back end of the portable computer in the space defined between the bottom surface of the portable computer and the plane extending from the front to the bottom surface of the handle; and
    a conversion card having two ends said first end adapted to physically and electrically interconnect to said portable computer's expansion slot, said second end adapted to physically and electrically interconnect to a standard PC expansion card, said expansion card holder cooperating with the bottom surface of the portable computer to form a substantially enclosed compartment for holding the expansion card.

2. A device according to claim 1 wherein the expansion card holder having a major surface and upright walls;
    said major surface having dimensions approximately 28.6 cm long and 12.1 cm wide;
    said upright walls having a depth of approximately 1.6 cm; whereby
    said expansion card holder is large enough to enclose a standard PC expansion card of ⅔ length or less.

3. A device according to claim 2 whereby the portable computer is a Toshiba T3100;
    and said attachment means uses pre-existing holes in said T3100;
    said expansion card carrier is attached to a bottom rear surface of the said T3100; and
    said T3100 with said expansion card carrier attached fits into said T3100 carrying case.

4. A device according to claim 2 whereby the portable computer is a Toshiba T1100 plus;
    said attachment means uses pre-existing holes in said T1100 plus; and
    said expansion card carrier is attached to the bottom rear of said T1100 plus; and
    said T1100 plus with said expansion card carrier attached fits into said T1100 plus carrying case.

5. A device according to claim 2 whereby the portable computer is a Toshiba T1200;
    said attachment means uses pre-existing holes in said T1200; and
    said expansion card carrier is attached to the bottom rear of said T1200; and
    said T1200 with said expansion card carrier attached fits into said T1200 carrying case.

6. An expansion apparatus for mounting an expansion card on a portable computer having a bottom surface, a back end, a front end, and a handle proximate the back end, the portable computer being supportable on a flat surface such as a desk top proximate its front end and a bottom surface of its handle so as to define a space between the bottom surface of the computer and a plane extending from the front end of the portable computer to the bottom surface of the handle, the apparatus comprising:
    a hollow rigid expansion card holder mounted on the bottom surface of the computer proximate the back end of the portable computer is the space defined between the bottom surface of the portable computer and the plane extending from the front end to the bottom surface of the handle; and
    means for mounting said expansion card holder on the bottom surface of the portable computer, said expansion card holder cooperating with the bottom surface of the portable computer to form a substantially enclosed compartment for holding the expansion card.

7. A method of mounting an expansion card on a portable computer having a bottom surface, a back end, a front end, and a handle proximate the back end, the portable computer being supportable on a flat surface such as a desk top proximate its front end and a bottom surface of its handle so as to define a space between the bottom surface of the computer and a plane extending from the front end of the portable computer to the bottom surface of the handle, the method comprising the steps of:
    positioning the expansion card in a card carrier,
    affixing the card carrier to the bottom surface of the portable computer proximate the back end of the portable computer in the space defined between the bottom surface of the portable computer and the plane extending from the front end to the bottom surface of the handle; and electrically interconnecting the portable computer to the expansion card.

8. A method in accordance with claim 7 wherein the step of electrically interconnecting includes the step of converting an electrical interface of the portable computer to that of the expansion card and vice versa.

9. A method in accordance with claim 8 wherein the step of converting the electrical interface includes the steps of positioning interface conversion circuitry in the card carrier, interconnecting the conversion circuitry to an electrical bus system of the expansion card, and interconnecting the conversion circuitry to an electrical bus system of the portable computer.

10. A method in accordance with claim 8 further including the step of electrically interconnecting the expansion card to a local area network, the expansion card including local area network circuitry and a connector for physically and electrically connecting the expansion card to the local area network.

* * * * *